United States Patent
Lee et al.

(10) Patent No.: US 9,924,551 B2
(45) Date of Patent: Mar. 20, 2018

(54) METHOD FOR SETTING COMMUNICATION IN WI-FI DIRECT SERVICE SYSTEM, AND APPARATUS THEREFOR

(71) Applicant: LG ELECTRONICS INC., Seoul (KR)

(72) Inventors: Wookbong Lee, Anyang-si (KR); Byungjoo Lee, Anyang-si (KR); Jinho Kim, Anyang-si (KR); Dongcheol Kim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 155 days.

(21) Appl. No.: 14/442,381

(22) PCT Filed: Nov. 8, 2013

(86) PCT No.: PCT/KR2013/010124
§ 371 (c)(1),
(2) Date: May 12, 2015

(87) PCT Pub. No.: WO2014/084519
PCT Pub. Date: Jun. 5, 2014

(65) Prior Publication Data
US 2016/0278144 A1    Sep. 22, 2016

Related U.S. Application Data

(60) Provisional application No. 61/730,972, filed on Nov. 29, 2012, provisional application No. 61/730,969, (Continued)

(51) Int. Cl.
*H04W 76/02* (2009.01)
*H04W 84/12* (2009.01)
(Continued)

(52) U.S. Cl.
CPC ....... *H04W 76/023* (2013.01); *H04L 67/1044* (2013.01); *H04L 67/146* (2013.01); *H04W 8/005* (2013.01); *H04W 84/12* (2013.01)

(58) Field of Classification Search
CPC ... H04W 76/023; H04W 84/12; H04W 84/18; H04W 76/02; G06F 17/30613;
(Continued)

(56) References Cited

U.S. PATENT DOCUMENTS

2007/0141988 A1    6/2007 Kuehnel et al.
2007/0218924 A1    9/2007 Burman et al.
(Continued)

FOREIGN PATENT DOCUMENTS

CN    1732673    2/2006
CN    102045783    5/2011
(Continued)

OTHER PUBLICATIONS

PCT International Application No. PCT/KR2013/010124, Written Opinion of the International Searching Authority dated Feb. 27, 2014, 16 pages.

(Continued)

*Primary Examiner* — Wutchung Chu
(74) *Attorney, Agent, or Firm* — Lee, Hong, Degerman, Kang & Waimey

(57) ABSTRACT

The present invention relates to a wireless communication system. More particularly, the present invention relates to a method for transmitting, if an advertiser device is set to delay a session with respect to the request for a session from a seeker device, session delay information to the seeker device in a method for setting Wi-Fi direct service communication and to an apparatus therefor.

18 Claims, 8 Drawing Sheets

Related U.S. Application Data filed on Nov. 29, 2012, provisional application No. 61/821,250, filed on May 9, 2013.

(51) Int. Cl.
  *H04L 29/08* (2006.01)
  *H04W 8/00* (2009.01)

(58) Field of Classification Search
  CPC .. G06F 1/1632; G06F 1/325; G06F 17/30622; G06F 17/30657; H04L 67/12; H04L 67/16; H04L 67/104; H04L 67/1044; H04L 67/1046
  See application file for complete search history.

(56) References Cited

U.S. PATENT DOCUMENTS

| | | | |
|---|---|---|---|
| 2007/0244811 A1* | 10/2007 | Tumminaro | G06Q 20/10 705/39 |
| 2010/0250497 A1* | 9/2010 | Redlich | F41H 13/00 707/661 |
| 2011/0149806 A1 | 6/2011 | Verma et al. | |
| 2012/0243524 A1 | 9/2012 | Verma et al. | |
| 2012/0265913 A1 | 10/2012 | Suumaki et al. | |
| 2012/0297229 A1 | 11/2012 | Desai et al. | |
| 2013/0040576 A1* | 2/2013 | Yoon | H04W 8/005 455/41.2 |
| 2013/0170482 A1* | 7/2013 | Jung | H04W 8/005 370/338 |
| 2013/0229944 A1* | 9/2013 | Montemurro | H04W 4/206 370/254 |
| 2013/0317892 A1* | 11/2013 | Heerboth | H04W 88/08 705/14.4 |
| 2013/0336161 A1* | 12/2013 | Jung | H04W 76/023 370/254 |
| 2014/0044114 A1* | 2/2014 | Lee | H04W 76/023 370/338 |
| 2014/0337544 A1* | 11/2014 | Huang | H04W 48/12 710/63 |
| 2015/0117430 A1* | 4/2015 | Zhuang | H04L 67/16 370/338 |
| 2015/0341849 A1* | 11/2015 | Lee | H04W 48/16 455/41.2 |

FOREIGN PATENT DOCUMENTS

| | | |
|---|---|---|
| EP | 1940080 | 7/2008 |
| EP | 2696643 | 2/2014 |
| EP | 2869642 | 5/2015 |
| JP | 2012049625 | 3/2012 |
| JP | 2012199905 | 10/2012 |
| JP | 2015531205 | 10/2015 |
| RU | 2398362 | 8/2010 |
| RU | 2463717 | 10/2012 |
| WO | 2010/028690 | 3/2010 |
| WO | 2012/060611 | 5/2012 |
| WO | 2014025217 | 2/2014 |

OTHER PUBLICATIONS

European Patent Office Application Serial No. 138578265, Search Report dated Jul. 13, 2016, 12 pages.
Wi-Fi Alliance Technical Committee P2P Task Group, "Wi-Fi Peer-to-Peer (P2P) Technical Specification Version 1.1", XP009163866, Jan. 1, 2010, 159 pages.
Wi-Fi Alliance Technical Committee Wi-Fi Display Technical Task Group, "Wi-Fi Display Technical Specification Version 1.0.0", XP009172467, Aug. 24, 2014, 149 pages.
"Wi-Fi Peer-to-Peer Services (P2Ps) Technical Specification (for Wi-Fi Direct services certification) Version 1.2", XP055235113, Aug. 21, 2014, 100 pages.
PCT International Application No. PCT/KR2013/010124, Written Opinion of the International Searching Authority dated Feb. 27, 2014, 12 pages.
Russian Federation Federal Service for Intellectual Property, Patents and Trademarks Application Serial No. 2015118700/08, Office Action dated Jul. 20, 2016, 13 pages.
The State Intellectual Property Office of the People's Republic of China Application No. 201380062479.5, Office Action dated Oct. 19, 2017, 18 pages.

* cited by examiner

METHOD FOR SETTING COMMUNICATION IN WI-FI DIRECT SERVICE SYSTEM, AND APPARATUS THEREFOR

CROSS-REFERENCE TO RELATED APPLICATIONS

This application is the National Stage filing under 35 U.S.C. 371 of International Application No. PCT/KR2013/010124, filed on Nov. 8, 2013, which claims the benefit of U.S. Provisional Application Nos. 61/730,972, filed on Nov. 29, 2012, 61/730,969, filed on Nov. 29, 2012 and 61/821,250, filed on May 9, 2013, the contents of which are all hereby incorporated by reference herein in their entirety.

TECHNICAL FIELD

The present invention relates to a wireless communication system and, more particularly, to a Wi-Fi Direct services (WFDS) communication setup method and device. More specifically, the present invention relates to a method for controlling a deferred session and a device therefor.

BACKGROUND ART

Wireless communication systems have been widely deployed in order to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, and a single-carrier frequency division multiple access (SC-FDMA) system.

Standards for a wireless local area network (WLAN) technology have been developed by the institute of electrical and electronics engineers (IEEE) 802.11 group. IEEE 802.11a and b use an unlicensed band at 2.4. GHz or 5 GHz and IEEE 802.11b provides a transmission rate of 11 Mbps. IEEE 802.11a provides a transmission rate of 54 Mbps. IEEE 802.11g provides a transmission rate of 54 Mbps by applying orthogonal frequency division multiplexing (OFDM) at 2.4 GHz. IEEE 802.11n provides a transmission rate of 300 Mbps by applying multiple input multiple output (MIMO)-OFDM. IEEE 802.11n supports a channel bandwidth of up to 40 MHz and, in this case, provides a transmission rate of 600 Mbps. IEEE 802.11p is a standard for supporting wireless access in vehicular environments (WAVE). For example, 802.11p provides improvements necessary for support of intelligent transportation systems (ITS). IEEE 802.11ai is a standard for supporting fast initial link setup of an IEEE 802.11 station (STA).

With recent widespread application of a short-range communication technology, such as Wi-Fi, to the market, devices may be directly connected to each other instead of being connected to each other via a local network. One technology for a direct connection between devices using Wi-Fi is Wi-Fi Direct.

Wi-Fi Direct is a standard for network connectivity technologies that describes operation of a link layer. With the lack of definitions of regulations or standards for applications on top of Wi-Fi Direct, when applications are executed after a connection between Wi-Fi Direct devices is established, interoperability and inconsistency in operation between the devices occur. Due to these problems, a standard specification, called Wi-Fi Direct services (WFDS), including the technical contents of higher-layer applications is being developed by the Wi-Fi alliance (WFA).

As the WFA has recently announced a new specification for data transfer through a direct connection between mobile devices, called Wi-Fi Direct, accelerated technology development of relevant institutes is ongoing to meet a Wi-Fi Direct specification. In a strict sense, Wi-Fi Direct is a marketing term corresponding to a trademark and is referred to as Wi-Fi peer-to-peer (P2P) in a technical specification therefor. Accordingly, Wi-Fi Direct and Wi-Fi P2P are used interchangeably in the present invention in dealing with a Wi-Fi based P2P technology. In a traditional Wi-Fi network, generally, a Wi-Fi equipped device accesses an Internet network via an access point (AP). A data communication method through a direct connection between devices has been conventionally used by some users using devices such as cellular phones or notebook PCs adopting a wireless communication technique such as Bluetooth. However, a transmission rate is low and an actually used transmission distance is limited to 10 m or less. Especially, when this method is used in an environment in which large-capacity data transmission is needed or many Bluetooth devices are present, there is a technical limitation in performance that a user feels.

Meanwhile, Wi-Fi P2P has added parts for supporting direct communication between devices while maintaining most functions of an existing Wi-Fi standard specification. Therefore, Wi-Fi P2P has an advantage of providing P2P communication between devices by sufficiently utilizing hardware and physical properties of Wi-Fi chip equipped devices and mainly upgrading software functions alone.

As is well known, Wi-Fi chip equipped devices have been expanded to various fields including notebook PCs, smartphones, smartTVs, game consoles, and cameras and have created a sufficient number of suppliers and technical development manpower. However, software for supporting the Wi-Fi P2P specification has not been actively developed. This is because relevant software capable of conveniently using the specification has not been distributed although the Wi-Fi P2P specification was announced.

A P2P group includes a device acting as an AP over an existing infrastructure network and this device is referred to as a P2P group owner (GO) in the P2P specification. There may be various P2P clients around the P2P GO. One P2P group includes only one GO and client devices corresponding to the other devices except for the GO.

FIG. 1 is a diagram illustrating a typical P2P network topology.

As illustrated in FIG. 1, a P2P GO may be directly connected to a client having a P2P function or may be connected to a legacy client having no P2P function.

FIG. 2 is a diagram illustrating a situation in which one P2P device forms a P2P group and simultaneously operates as an STA of a WLAN to be connected to an AP.

The P2P technical specification defines an operation mode of P2P devices as illustrated in FIG. 1 as a concurrent operation.

In order for a series of P2P devices to form a group, which of the device becomes a P2P GO is determined by GO intent values of a P2P attribute ID. These values range from 0 to 15. The P2P devices exchange the GO intent values and a device having the greatest value becomes the P2P GO. Meanwhile, although a legacy device that does not support Wi-Fi P2P technology may also belong to the P2P group, the function thereof is limited to accessing an infrastructure network through the P2P GO.

According to the Wi-Fi P2P specification, since the P2P GO transmits a beacon signal using OFDM, 11b specification is not supported and 11a/g/n specification may be used for Wi-Fi P2P devices.

To perform an operation for setting up a connection between a P2P GO and a P2P client, the P2P specification broadly includes the following four functions.

First, P2P Discovery deals with technical items such as device discovery, service discovery, group formation, and P2P invitation. For device discovery, two P2P devices exchange device related information such as device names or device types on the same channel. For service discovery, the P2P devices exchange information regarding a service to be used through P2P. Group formation is a function for forming a new group by determining which device becomes the P2P GO. P2P invitation is a function for calling a permanently formed P2P group or causing a P2P device to participate in an existing P2P group.

Second, P2P Group Operation describes formation and completion of a P2P group, connection to the P2P group, communication in the P2P group, a service for P2P client discovery, operation of a persistent P2P group, etc.

Third, P2P Power Management describes a P2P device power management method and a signal processing method at a power saving mode timing.

Last, Managed P2P device describes a method in which one P2P device forms a P2P group and simultaneously accesses an infrastructure network through a WLAN AP.

Characteristics of the P2P group will now be described. The P2P group is similar to an existing infrastructure basic service set (BSS) in that a P2P GO serves as an AP and a P2P client serves as an STA. Accordingly, a P2P device needs to be equipped with software capable of performing roles of the GO and the client. P2P devices are distinguished from each other using P2P addresses such as medium access control (MAC) addresses. Notably, P2P devices that perform communication in the P2P group using P2P interface addresses need not use globally unique ID addresses. The P2P group has a single P2P group ID comprised of a combination of a service set identifier (SSID) and a P2P device address of the P2P GO. In the Wi-Fi P2P specification, WPA2-PSK/AES is used for security. The life cycle of the P2P group includes a temporary connection method, and a persistent connection method in which the same connection is attempted after a predetermined time. In the persistent group connection method, once the P2P group is formed, roles, certification, SSIDs, and a P2P group ID of the devices are cashed and so that a quick group reconnection may be established by applying the same connection format.

A Wi-Fi P2P connection method will now be described. A Wi-Fi device connection process broadly includes two phases. The first phase is discovery in which two P2P devices find each other and the second phase is group formation in which the role of a P2P GO or a P2P client is determined between the discovered devices. The first discovery phase causes P2P devices to be connected to each other and includes a search state and a listen state. In the search state, the devices perform active search using a Probe Request frame. For quick search, the range of search is restricted and search is performed using social channels ch1, ch6, and ch11. A P2P device of the listen state maintains the listen state by selecting only one of the three social channels. Upon receiving the Probe Request frame transmitted by another P2P device in the search state, the P2P device responds with a Probe Response frame. The P2P devices may reach a common channel after repeatedly performing the search state and the listen state. For selective association after finding each other, the P2P devices use the Probe Request frame and the Probe Response frame to discover a device type, a manufacturer, or a familiar device name. In order to confirm whether an inter-device compatible service is present in the P2P group, the P2P devices may use service discovery. This is intended to determine whether a service provided in each device is compatible with another device. In the P2P specification, a specific service discovery specification is not designated. A user of the P2P device may search proximate P2P devices and services provided by the devices, thereby quickly connecting to a desired device or service.

Group formation, which is the second phase, will now be described. If the P2P devices complete the above-described discovery (find) phase, checking as to whether the counterpart device is present is completed. Based on the discovery phase, the two P2P devices need to enter a GO negotiation phase to configure a BSS. The negotiation phase is broadly divided into two sub-phases: a GO negotiation phase and a Wi-Fi protected setup (WPS) phase. In the GO negotiation phase, the devices negotiates with each other about a role as a P2P GO or a P2P client and set an operating channel to be used in the P2P group. In the WPS phase, typical operation is performed as in existing WPS, for example, exchange of PIN information input by a user on a keypad or simple setup through a push button. In the P2P group, the P2P GO is in charge of a core role of the P2P group. The P2P GO assigns a P2P interface address, selects an operating channel of the group, and sends a beacon signal including various operating parameters of the group. In the P2P group, only the P2P GO is capable of transmitting the beacon signal. Using the beacon signal, the P2P device quickly confirms the P2P GO and participates in the group in a scan phase which is an initial connection phase. Alternatively, the P2P GO may autonomously initiate a P2P group session or may initiate the session after using the method described in the P2P discovery phase. Since a value for the P2P GO performing an important role is not fixed for any device but is variable by an application or a higher-layer service, a developer may select a proper value corresponding to the P2P GO according to usage of an application program.

Next, P2P addressing will be described. A P2P device assigns a P2P interface address using a MAC address in a P2P group session. The P2P interface address of a P2P GO is a BSS ID which substantially indicates a MAC address of the P2P GO.

Disassociation of the P2P group will now be described. If a P2P session is ended, the P2P GO needs to inform all P2P clients that the P2P group session is ended through de-authentication. The P2P client may also perform disassociation for the P2P GO and, in this case, a disassociation procedure is needed if possible. Upon receiving a disassociation release request from a P2P client, the P2P GO may recognize that the P2P client has been disassociated. Upon sensing an abnormal protocol error from a P2P client or sensing a P2P client that hinders a connection of the P2P group from the P2P client, the P2P GO triggers rejection of authentication or denial of association. The P2P GO records the reason of failure in an association response and then transmits the response.

In a session connection procedure among the above processes, when a seeker device (service seeker) desires to use specific WFDS according to a conventional scheme, if an advertiser device (service advertiser) is configured not to permit automatic acceptance (auto_accept), the advertiser device may defer a session request but does not transmit information indicating that a session has been deferred to the seeker device. Accordingly, the seeker device has to wait until the session request for the deferred session is received again from the advertiser device. In addition, upon accepting the session request, a user of the advertiser device can determine only whether to accept the session request. Consequently, a procedure of transmitting additional information about the session request between two devices is needed.

These problems will now be described by way of example. It is assumed that the seeker device is a smartphone, the advertiser device is a printer device, and a service that the seeker device is to use is a print service for printing an image in the interior of the smartphone through the printer device. Although the printer device may be present in the vicinity of a smartphone user, the printer device may be installed in a place which is not near the smartphone user. In this case, the printer device may be configured to perform the print service only when the printer device accepts a service request. This is because the printer device may be configured not to permit auto_accept by the user although the printer device may immediately perform the print service with respect to a service request of the smartphone in the case in which the printer device is configured to permit anto_accept.

Accordingly, it is necessary to display information indicating that a session request for the print service has been deferred on the smartphone. Information about a session requested service may be displayed on the printer device so that additional information (e.g. information indicating that a print service is $0.1 per sheet) may be displayed for the user of the printer device.

In the case of the first session request between the smartphone and the printer device, information indicating that a session has been deferred may be included in a response message to the session request and then may be transmitted. However, if the smartphone and the print device have already been connected, there is no method for transmitting a message indicating that the session has been deferred.

DISCLOSURE

Technical Problem

An object of the present invention devised to solve the problem lies in providing a method for efficiently controlling a session connection in a Wi-Fi Direct services (WFDS) system and an apparatus for performing the same.

Another object of the present invention is to provide a method for controlling a session connection when the session connection is configured to be deferred in a WFDS system and an apparatus for performing the same.

The technical objects that can be achieved through the present invention are not limited to what has been particularly described hereinabove and other technical objects not described herein will be more clearly understood by persons skilled in the art from the following detailed description.

Technical Solution

The objects of the present invention can be achieved by providing a method for setting up Wi-Fi Direct services (WFDS) communication, including receiving, by a first device, a first provision discovery request frame including advertisement identifier (ID) related information from a second device; and transmitting, by the first device, a first provision discovery response frame to the second device, wherein, when the first device needs to wait for a confirmation session for a session request of a service based on the advertisement ID related information, the first provision discovery response frame includes information about deferment of a session related to the service.

The information about session deferment may be transmitted from a service entity of the first device to an application service platform (ASP) of the first device when the first device calls an AdvertiseService method.

The AdvertiseService method may be called before the first device receives the first provision discovery request frame.

A procedure for discovering the first device and the service discovery procedures may be performed before the first device receives the first provision discovery request frame and the AdvertiseService method may be called before the first device is discovered.

The method may further include transmitting, by the ASP of the first device, the information about session deferment to a user of the first device.

The method may further include transmitting, by an ASP of the second device, the information about session deferment to a service entity of the second device.

When the user of the first device accepts session deferment, the method may further include transmitting a second provision request frame to the second device; and receiving a second provision response frame from the second device.

The second provision discovery request frame may include connection capability information of the first device.

When the first device transmits a peer-dependent negotiation message to the second device as negotiation information of a peer-to-peer (P2P) group, the first device may become a group client of the P2P group upon receiving a response indicating that the second device becomes a group owner of the P2P group from the second device, and the first device may become a group owner of the P2P group upon receiving a response indicating that the second device becomes a group client of the P2P group from the second device.

When the first device transmits a message indicating that the first device becomes a group owner of the P2P group to the second device as negotiation information of the P2P group, the first device may become a group owner of the P2P group and the second device may become a group client of the P2P group.

When the first device transmits a message indicating that the first device becomes a group client of the P2P group to the second device as negotiation information of the P2P group, the first device may become a group client of the P2P group and the second device may become a group owner of the P2P group.

In another aspect of the present invention, provided herein is a method for setting up Wi-Fi Direct services (WFDS) communication, including receiving, by a first device, a session request message including an advertisement ID from a second device when an existing connection between the first device and the second device is present; transmitting, by the first device, a session deferment message to the second device, wherein, when the first device needs to wait for confirmation for a session request related to a service based on the advertisement ID, the session deferment messages includes information about deferment of a session related to the service.

The session request message and the session deferment message are configured to include an operation code (Opcode) and a sequence number.

The sequence number may be included in the session request message or an acknowledgement (ACK) or negative ACK (NACK) message transmitted as a response to the session request message.

In another aspect of the present invention, provided herein is a method for setting up Wi-Fi Direct services (WFDS) communication, including transmitting, by a second device, a first provision discovery request frame including advertisement identifier (ID) related information to a first device; and receiving, by the second device, a first provision discovery response frame from the first device, wherein, when the first device needs to wait for a confirmation session for a session request of a service based on the advertisement ID related information, the first provision discovery response frame includes information about deferment of a session related to the service.

In another aspect of the present invention, provided herein is a first apparatus for setting up Wi-Fi Direct services (WFDS) communication, including a transceiver; and a processor, wherein the processor is configured to receive, through the transceiver, a first provision discovery request frame including advertisement identifier (ID) related information from a second device and transmit, the transceiver, a first provision discovery response frame, and wherein, when the first device needs to wait for a confirmation session for a session request of a service based on the advertisement ID related information, the first provision discovery response frame includes information about deferment of a session related to the service.

Advantageous Effects

According to embodiments of the present invention, the following effects are obtained.

First, according to embodiments of the present invention, a session connection can be efficiently controlled in a WFDS system environment.

Second, according to embodiments of the present invention, when a session connection is deferred in a WFDS environment, information indicating that a session connection has been deferred can be transmitted to two devices supporting WFDS.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
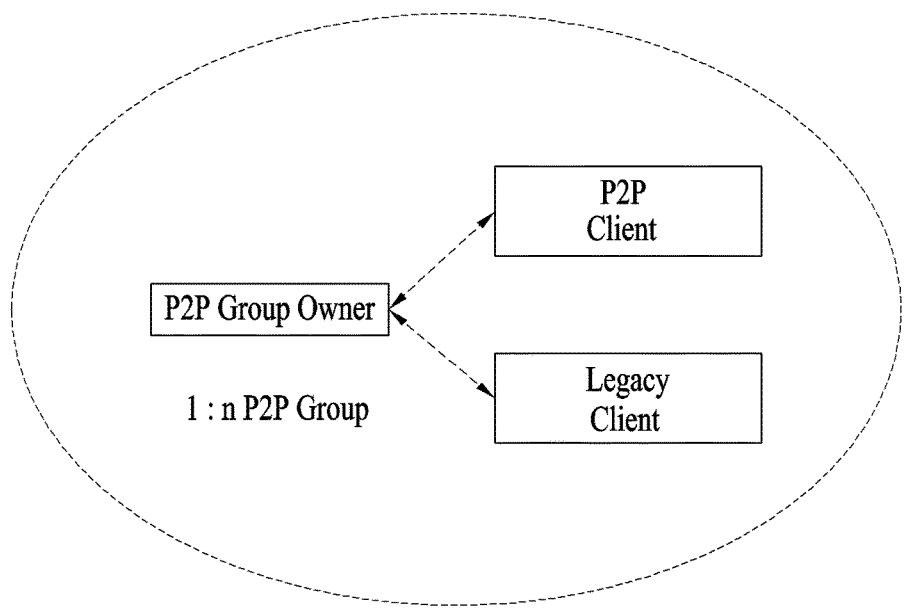
FIG. 1 is a diagram illustrating a typical P2P network topology.
Figure 2:
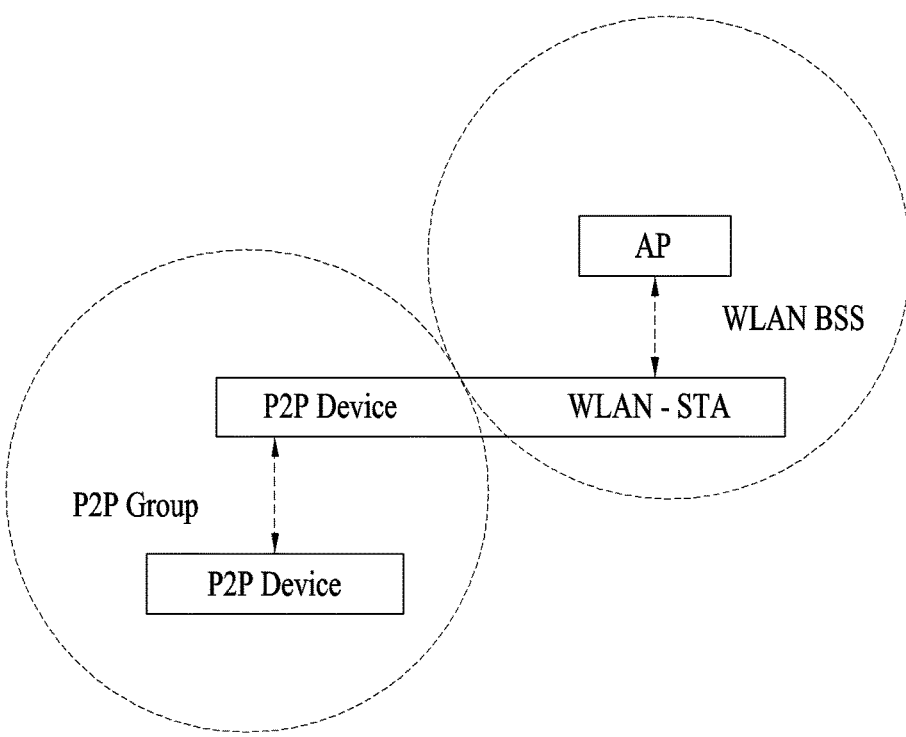
FIG. 2 is a diagram illustrating a situation in which one P2P device forms a P2P group and simultaneously operates as an STA of a WLAN to be connected to an AP.

The following technology can be used in various wireless access systems such as systems for code division multiple access (CDMA), frequency division multiple access (FDMA), time division multiple access (TDMA), orthogonal frequency division multiple access (OFDMA), single carrier frequency division multiple access (SC-FDMA), orthogonal frequency division multiplexing (OFDM), etc. CDMA may be implemented by radio technology such as universal terrestrial radio access (UTRA) or CDMA2000. TDMA may be implemented by radio technology such as global system for mobile communications (GSM)/general packet radio service (GPRS)/enhanced data rates for GSM evolution (EDGE). OFDMA may be implemented by radio technology such as IEEE 802.16 (WiMAX), IEEE 802.20, evolved-UTRA (E-UTRA), etc. OFDM may be implemented by radio technology such as IEEE 802.11.

For clarity, a description will be given focusing on IEEE 802.11 (Wi-Fi). However, the technical spirit of the present invention is not limited thereto. For example, the description given below can be supported by standard documents disclosed for at least one of wireless access systems such as the institute of electrical and electronics engineers (IEEE) 802, 3rd generation partnership project (3GPP), 3GPP long term evolution (3GPP LTE), LTE-advanced (LTE-A), and 3GPP2 systems. For steps or parts of which description is omitted to clarify the technical features of the present invention, reference may be made to these documents. Further, all terms as set forth herein can be explained by the standard documents.

Specific terms used in the following description are provided to aid in understanding of the present invention. These specific terms may be replaced with other terms within the scope and spirit of the present invention. In some instances, well-known structures and devices are omitted in order to avoid obscuring the concepts of the present invention and the important functions of the structures and devices are shown in block diagram form. The same reference numbers will be used throughout the drawings to refer to the same or like parts. Operation orders described in embodiments of the present invention may be rearranged. Some constructions or features of any one embodiment may be included in another embodiment and may be replaced with corresponding constructions or features of another embodiment.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out.

The following detailed description includes specific details in order to provide a thorough understanding of the present invention. However, it will be apparent to those skilled in the art that the present invention may be practiced without such specific details. For example, although the following detailed description is given under the assumption that a mobile communication system is a Wi-Fi Direct services (WFDS) system, aspects of the present invention that are not specific to the WFDS system are applicable to other arbitrary mobile communication systems.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal device refers to a mobile or fixed user device such as a user equipment (UE), a mobile station (MS), etc. It is also assumed that an access point refers to an arbitrary node of a network side, such as a node B, eNode B, a base station, etc., communicating with the terminal.

Conventional WFDS Setup Method

Figure 3:
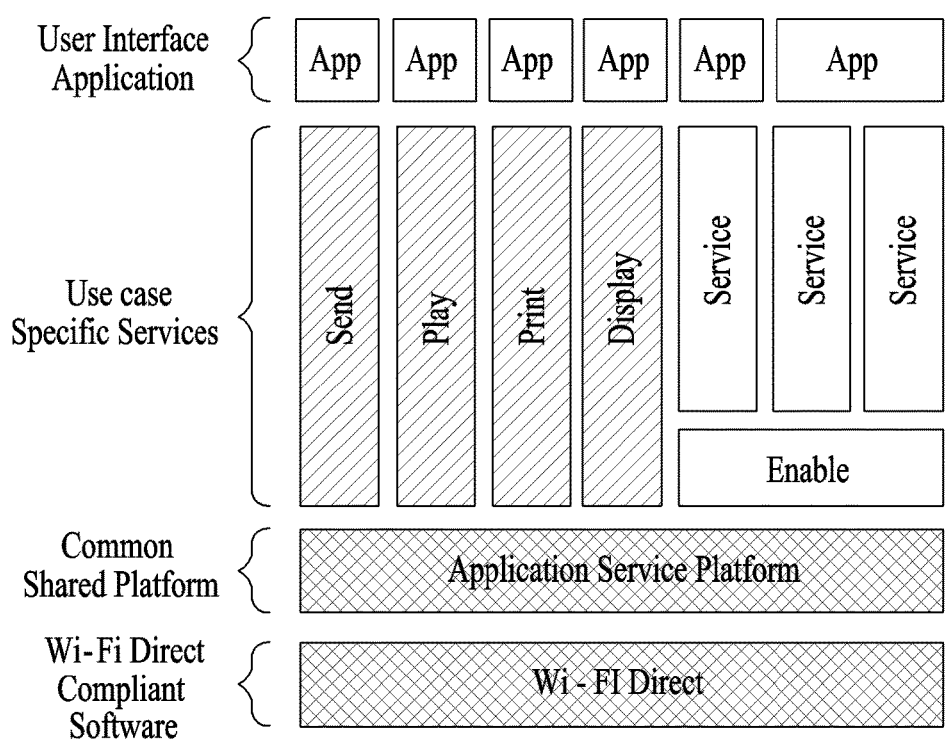
FIG. 3 is a schematic block diagram of a Wi-Fi Direct services (WFDS) device.

FIG. 3 is a schematic block diagram of a WFDS device.

A platform for application services, called an application service platform (ASP), is defined on a Wi-Fi Direct MAC layer and a higher layer. The ASP serves to perform session management between a higher application and lower Wi-Fi Direct, service command processing, and control and security between ASPs. On top of the ASP, four basic services defined in WFDS, i.e. Send, Play, Display, and Print services, corresponding applications, and user interfaces (UIs) are supported. The Send service represents a service and application capable of transferring files between two WFDS devices. The Play service represents a streaming service and application for sharing digital living network alliance (DLNA)-based audio/video (A/V), photographs, and music, between two WFDS devices. The Print service represents a service and application for enabling printing of documents and photographs between a device having content such as documents and photographs and a printer device. The Display service defines a service and application for enabling screen sharing between a Miracast source and a Miracast sink of the WFA. An Enable service is defined to use an ASP common platform in supporting a third party application in addition to the basic services.

Figure 4:
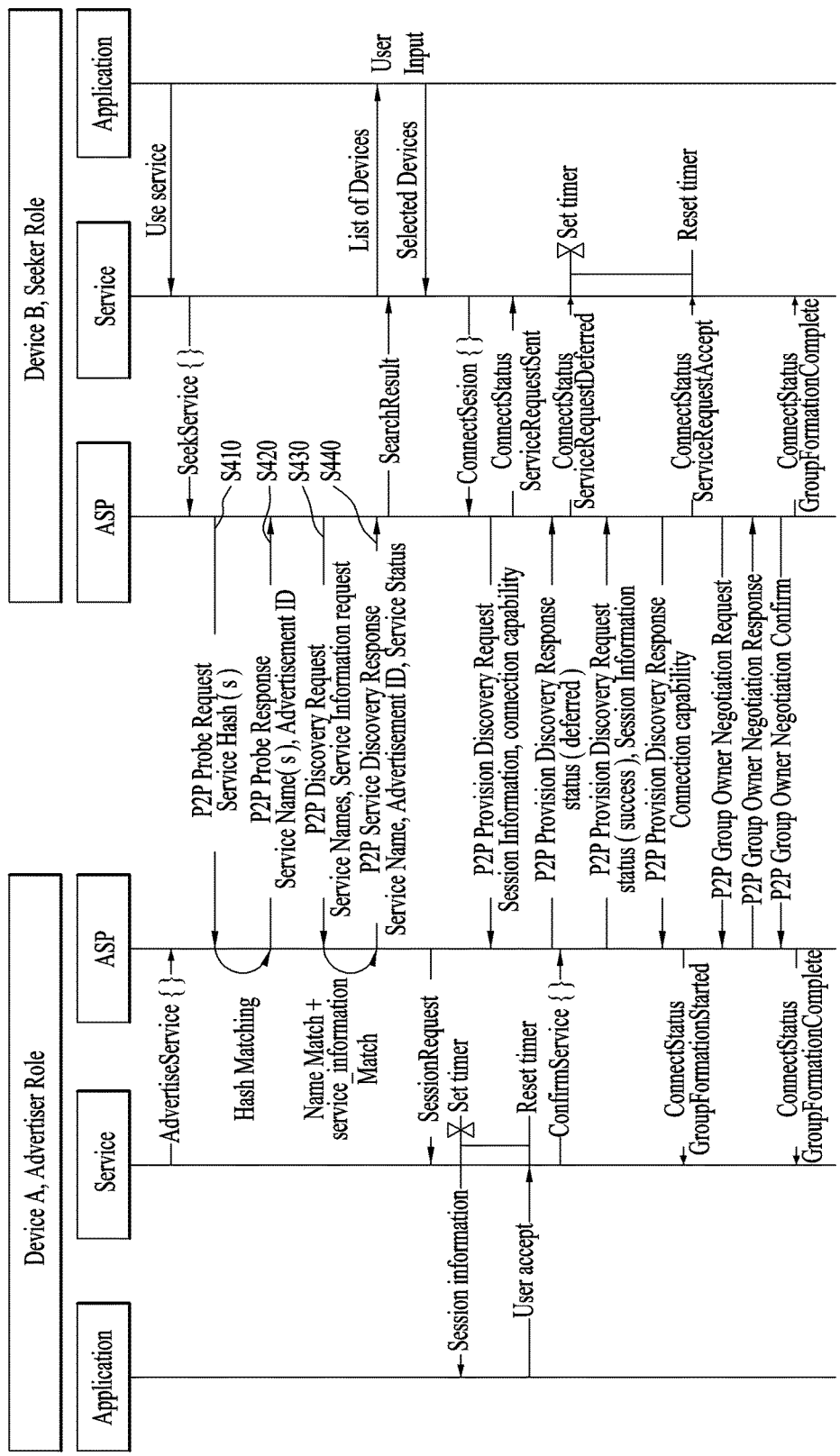
FIG. 4 is a diagram illustrating a WFDS session connection procedure through device discovery and service discovery between WFDS devices in existing WFDS.

FIG. 4 is a diagram illustrating a WFDS session connection procedure through device discovery and service discovery between WFDS devices in existing WFDS.

For convenience of description, it is assumed as illustrated in FIG. 4 that a device A serves as an advertiser for advertising WFDS that can be provided to a seeker and a device B functions to search for an advertised service. The device A is a device for advertising a service thereof and causing a peer device to seek and start the service and the device B is a device for performing a procedure for discovering the device supporting the service by a higher-layer application or a user request.

A service entity of the device A transmits WFDS information that can be provided thereby to an ASP of the device A. A service entity of the device B may also transmit WFDS information that can be provided thereby to an ASP of the device B. In the device B which serves as a seeker, the application entity of the device B informs the service entity of the device B of a service to use WFDS and the service entity commands the ASP to discover a device to use the WFDS.

In a procedure of transmitting and receiving a probe request/response frame, the seeker device has a purpose of searching for a nearby device thereof. The ASP of the device B transmits a peer-to-peer (P2P) Probe Request frame (S410) in order to find a WFDS target device thereof. The ASP of the device B inserts a service name that the ASP desires to discover or can support in the P2P Probe Request frame in the form of a hash. For example, if the service name is changed to a 6-octet hash value using SHA-256, "org.wi-fi.wfds.send.rx" may be expressed by "0xeb ac b9 5f 37 4e". Upon receiving the P2P Probe Request frame from the seeker, the device A transmits a P2P Probe Response frame to the device B (S420) when the corresponding service is supported. The P2P Probe Response frame includes a service supported by a service name or a hash value and a corresponding advertisement ID value. This procedure is a device discovery procedure in which the device A and the device B are capable of recognizing each other as a WFDS device. Device related information that can be obtained in the device discovery procedure may include a device name, a primary device type, a device password ID, etc.

The device discovery procedure will now be described. The device discovery procedure repeats a listen state and a search state and uses social channels ch1, ch6, and ch11 in a band of 2.4 GHz. The listen state waits for reception of the Probe Request frame in one of the channels ch1, ch6, and ch11 during a random time. In the search state, the Probe Request frame is transmitted.

Next, details of a specific service can be known through a P2P service discovery procedure. The device B that has discovered a device with which WFDS can be performed transmits a P2P Service Discovery Request frame to the corresponding device (S430). Upon receiving the P2P Service Discovery Request frame from the device B, the ASP of the device A matches a service included in Method called by the service entity of the device A with the P2P service name and P2P service information received from the device B and transmits a P2P Service Discovery Response frame to the device B (S440). In this process, a generic advertisement service (GAS) protocol defined in IEEE 802.11u may be used. If the request for service search is ended, the device B may inform the application and user of the search result. A Wi-Fi Direct group has not been established up to this point. When the user selects a service and thus the service entity performs a Connect session, P2P group formation is implemented.

If the device discovery (S410 and S420) and service discovery (S430 and S440) procedures are performed, a session connection between WFDS devices may be performed. In this process for the session connection, a P2P Provision Discovery Request frame (S450) and a P2P Provision Discovery Response frame (S460) are exchanged. This will now be described in more detail.

Figure 5:
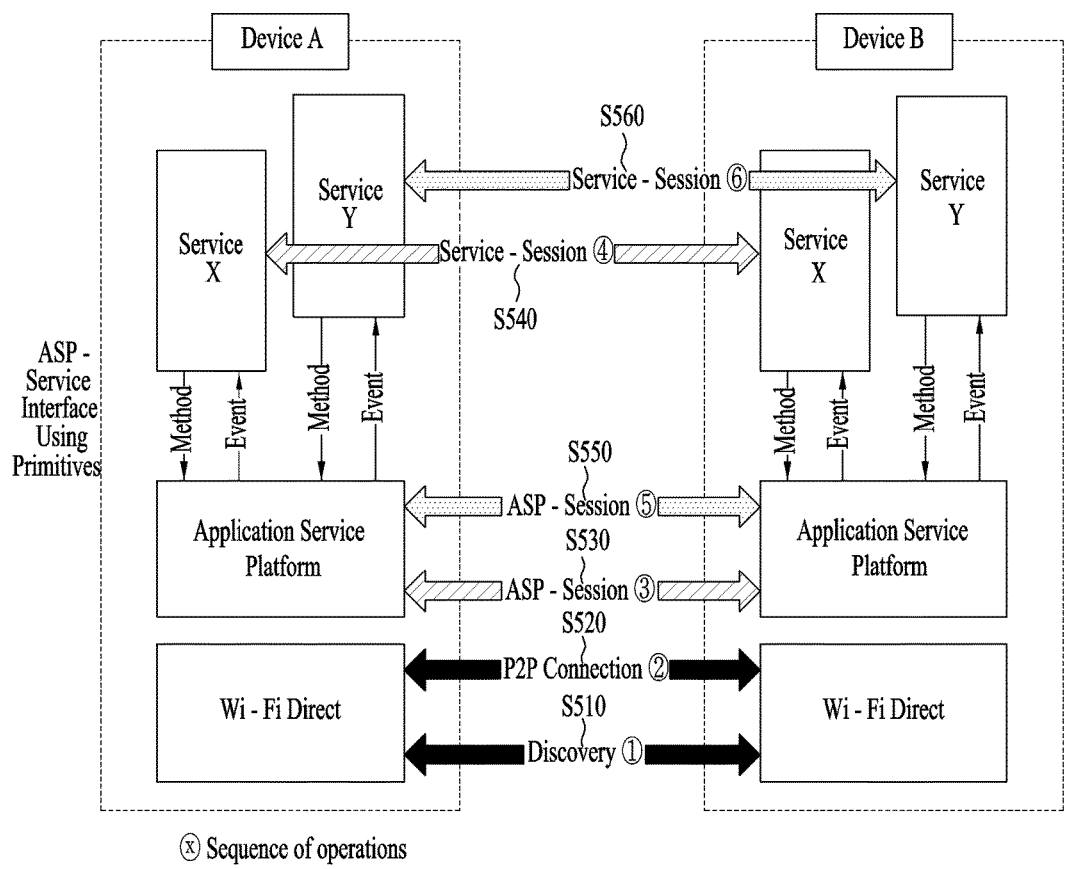
FIG. 5 is a diagram illustrating a connection operation between WFDS devices.

FIG. 5 is a diagram illustrating a connection operation between WFDS devices.

As illustrated in FIG. 5, a WFDS device performs a connection in order of discovery—P2P connection—ASP session—service session. An ASP is a logical entity that performs common functions needed by Play, Send, Display, and Print services. The common functions include, but are not limited to, service and device discovery, ASP-session management, connection topology management, and security.

The ASP session is a logical link between an ASP of one device and an ASP of another device. A P2P connection between peer devices is required to start the ASP-session.

One ASP may set up multiple ASP-sessions between two devices in a given P2P network. Each ASP-session may be identified by a session ID assigned by an ASP requesting the ASP-session.

For example, when a user desires to use service X between the device A and device B, two ASPs may generate an ASP-session therebetween and, when the user desires to use service Y, two ASPs may create another ASP-session for service Y different from service X.

Figure 6:
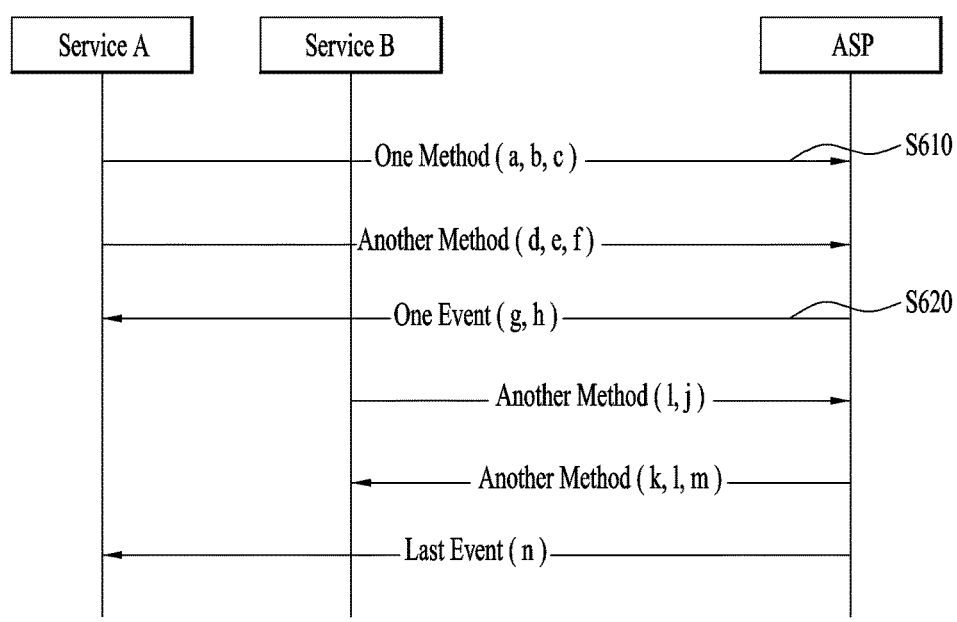
FIG. 6 is a diagram illustrating the relationship of an interface between a service entity and an ASP.

FIG. 6 is a diagram illustrating the relationship of an interface between a service entity and an ASP.

As illustrated in FIG. 6, a Method is transmitted from a service entity of one device to an ASP (S610) and an Event is transmitted from the ASP to the service entity (S620). A plurality of service entities may be present for one WFDS and each service entity may transmit a Method to the ASP. In addition, one service entity may transmit a plurality of Methods and one ASP may transmit a plurality of Events.

In order to establish and maintain a connection with a peer device in Wi-Fi Direct, a service seeker searches for an advertised service on a remote device and a service advertiser may advertise a service that can be provided while potentially expecting service search of the service seeker. A single device may be a plurality of service advertisers and may be a plurality of service seekers. A service is identified by a service name. Each service is represented by a UTF-8 service name string. For example, "org.wi-fi" is reserved for a service defined by the WFA. The defined services are shown in Table 1 below.

TABLE 1

| org.wi-fi.wfds.send.tx | org.wi-fi.wfds.send.rx |
| org.wi-fi.wfds.play.tx | org.wi-fi.wfds.play.rx |
| org.wi-fi.wfds.display.tx | org.wi-fi.wfds.display.rx |
| org.wi-fi.wfds.print.tx | org.wi-fi.wfds.print.rx |

A Method represents an action initiated by a service entity, with information about an action to be taken contained in a Method parameter. Only limited information returns as a Method call return value and all Method calls can immediately send a return value.

An Event is an operation providing information from the ASP to the service entity. Since the Event is one-way, a service needs to follow up with a Method call in order to take an action based on the contents of the Event.

Multiple service entities connected to one ASP may perform Methods and Events. The Methods and Events are asynchronous. Accordingly, a Method need not be necessarily followed by an Event.

Embodiment 1—In Case of New P2P Connection

In the case in which an advertiser device is configured to defer a session request in a new P2P connection setup procedure, a procedure of transmitting information about a deferred session to a seeker device will be described hereinbelow as an embodiment applied to the present invention.

Figure 7:
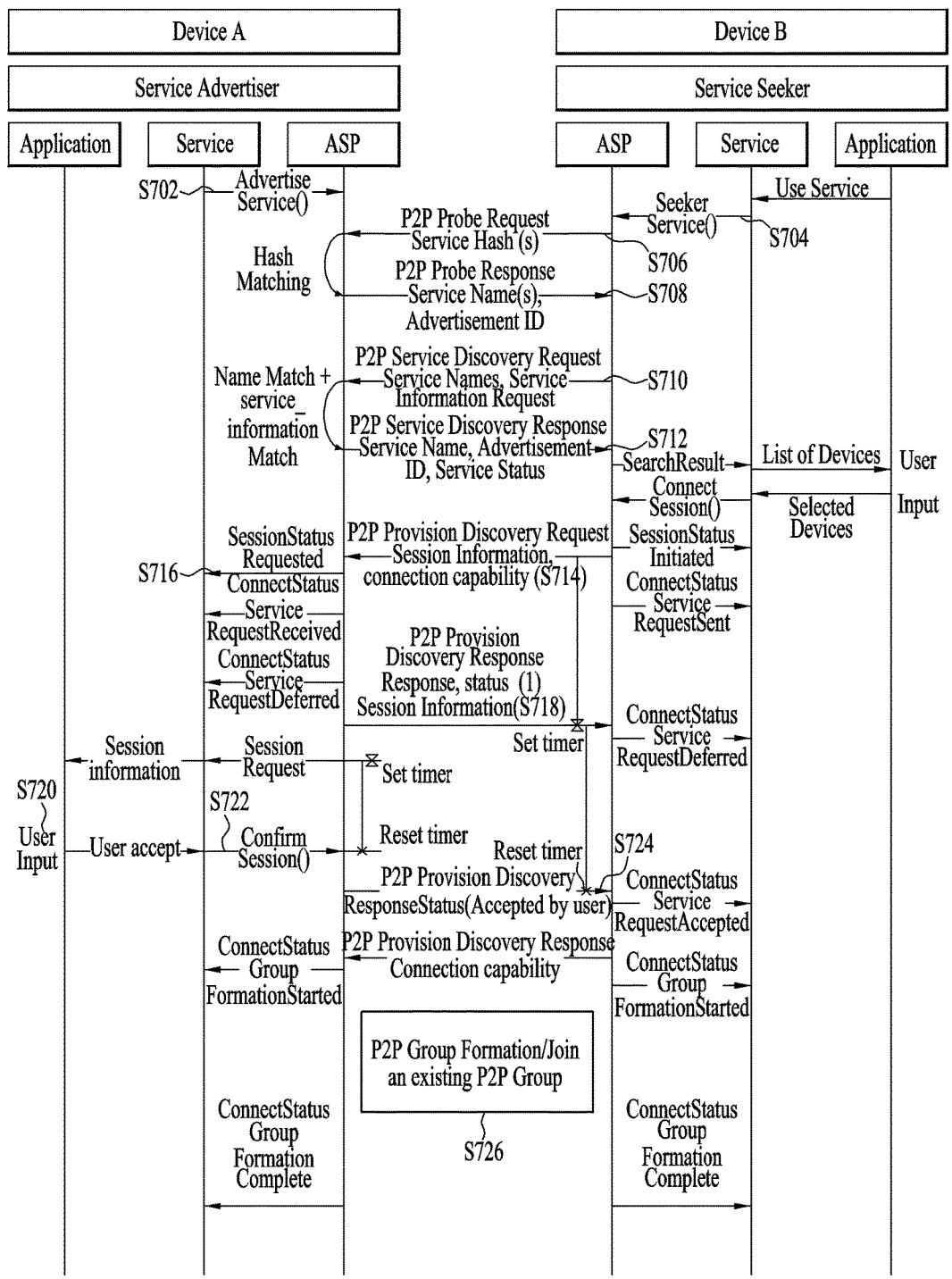
FIG. 7 is a flowchart illustrating an example of a session deferment setup procedure according to an embodiment of the present invention.

FIG. 7 is a flowchart illustrating an example of a session deferment setup procedure according to an embodiment of the present invention.

As illustrated in FIG. 7, when a device A (first device) is a service advertiser a device B (second device) is a service seeker, the device A, which is an advertiser, may call an AdvertiseService Method and transmit a service that can be provided thereby to an ASP thereof (S702). During calling of the AdvertiseService Method, session deferment setup means the case of auto_accept=FALSE indicating a state in which a session request is not automatically accepted.

The device B, which is a seeker, may call a SeekService Method which searches for a service to be used and transmit the service to be used to an ASP thereof. The device A may perform device discovery (S706 and 708) and service discovery (S710 and S712) and then receive a Provision Discovery Request frame from the device B (S714). In response to the Provision Discovery Request frame, the device A may transmit a Provision Discovery Response frame to the device B (S718). The device A may be configured to defer a session request prior to performing the device discovery (probe discovery) procedure (S702). Since the device A is configured to defer a session, the device A should defer the session upon receiving a service session request based on advertisement ID related information and wait for a confirmation session. In addition, the device A may include information indicating that the session has deferred in the Provision Discovery Response frame and then transmit the Provision Discovery Response frame to the device B, which is a seeker. In this case, which service session is requested may be determined based on an advertisement ID (advertise_id) included in the Provision Discovery Request frame. In addition, the device A may inform a user that the session has been deferred (S716) and the user of the advertiser device may receive session information and determine whether to accept the session (S720). If there is input as to whether to accept the session (S722), the device A may transmit a Follow-on Provision Discovery Request frame to the device B (S724). If session acceptance information is included in the Follow-on Provision Discovery Request frame, the second device may transmit a Follow-on Provision Discovery Response frame to the device A (S726) to complete a session connection. If session rejection information is included in the Follow-on Provision Discovery Request frame, the device B may end the session request.

Hereinafter, the above-described processes will be described in more detail.

Embodiment 1-1: Session Deferment Setup During Calling of AdvertiseService Method First, a procedure in which an advertiser device sets up session deferment will now be described.

The advertiser device may transmit information about a service that the advertiser device advertises to the ASP (S702) before receiving a discovery request (before receiving a Probe Request frame) from the seeker device. Namely, the advertise device may perform service advertisement with respect to the ASP through an AdvertiseService Method.

The AdvertiseService Method provides information so that a service seeker may search for a service advertised on another device and initiate an ASP-session. The AdvertiseService Method is as follows.

AdvertiseService (service_name, auto_accept, service_information, service_status, session_information_response)

The AdvertiseService Method includes a plurality of parameters, each of which will now be described.

A service name (service_name) parameter is an ID for identifying a service which is searchable by the service seeker performing a SeekService Method. The service_name parameter may consist of one or multiple single-byte UTF-8 or multi-byte UTF-8 characters. The single-byte UTF-8 characters may include alphanumeric values, a hyphen ("-"), and a period (".") and the multi-byte UTF-8 characters may include all valid UTF-8 characters. The ASP may use the service_name parameter by matching a service name in a service discovery procedure. For example, when the ASP advertises a character string "org.wi-fi.wfds", if the seeker transmits a hash value for "org.wi-fi.wfds", the ASP of the advertiser side may respond positively.

An automatic acceptance (auto_accept) parameter may have a value of TRUE or FALSE. If the auto_accept parameter has a value of TRUE, the advertiser may accept a session request of the seeker even without receiving a ConfirmSession Method (i.e. this means that automatic acceptance is performed). If the auto_accept parameter has a value of FALSE, the ASP of the advertiser should wait for a confirmation session from a service entity prior to proceeding. Accordingly, session deferment setup means the case of auto_accept==FALSE indicating that an automatic session request is not accepted.

A service information (service_information) parameter may include detailed information about service related information exchanged in the service discovery procedure. If a value of the service_information parameter is present, the service_information parameter may be transmitted to the seeker and the seeker may search the contents of the service_information parameter.

A service status (service_status) parameter indicates the status of a service at the time of calling of the AdvertiseService Method. The service_status parameter is 1 when the service is available and 0 when the service is unavailable, or vice versa. In this case, whether a mechanism of the discovery procedure (probe request or service discovery request) indicates that the service is supported by the device should be considered. If the service_status parameter indicates 0, the ASP may reject any request to set up an ASP-session.

A session information response (session_information_response) parameter is present only when the auto_accept parameter indicates FALSE (the case in which the session is established to be deferred) and, otherwise (auto_accept==TRUE), the session_information_response parameter indicates NULL. That is, the session_information_response parameter is not present in the AdvertiseService Method.

If the session_information_response parameter is present in the AdvertiseService Method, the session_information_response parameter is transmitted to the ASP of the seeker. If a provision discovery request is transmitted as part of ASP-session setup, the session_information_response parameter may be included as a session information response field in a Session Information Response Data Info attribute. If there is a connection between two devices, the session_information_response parameter may be included in a session information response field of a deferred session ASP (DEFERRED_SESSION ASP) coordination protocol message. The ASP of the seeker transmits the session_information_response parameter to the service entity of the seeker. In this case, the ASP of the seeker may transmit session_information_response parameter by setting a value of a ConnectStatus Event to status==ServiceRequestDeferred.

An advertisement ID (advertisement_id) parameter may be necessary. The advertisement_id parameter is defined by the ASP and the advertisement of a device for manipulation by a service that requests advertisement may be uniquely identified through the advertisement_id parameter. The advertisement_id parameter is transmitted to the seeker to establish an ASP-session. The advertisement_id parameter may be used in Methods such as ServiceStatusChange, CancelAdvertiseService, and ConnectSessions, Events such as SearchResult, AdvertiseStatus, and SessionRequest, and a session request message for calling a specific AdvertiseService Method. An advertisement of WFDS may be uniquely identified by exchanging the advertisement_id parameter and service MAC between devices.

Embodiment 1-2: Provision Discovery Request/Response

Before a seeker device discovers an advertiser device, the seeker device may call the above-described AdvertiseService Method, discover a device in the procedures (S706 and S708) of transmitting and receiving the Probe Discovery Request/Response frame, and then transmit a WFDS service to be used in the procedure (S710 and S712) of transmitting and receiving the Service Discovery Request/Response frame. Thereafter, the Provision Discovery Request/Response frame is transmitted and received in a service session request/response procedure. A method for transmitting session deferment information will now be described in detail.

A provision discovery procedure is mandatory before setting up a P2P connection for an ASP-session. The primary purpose of this procedure is to ensure a network role that each device is performs and to decide various parameters such as an operating channel. The provision discovery procedure includes two modes.

First, in an auto-accept mode, a Provision Discovery Request frame and a corresponding Provision Discovery Response frame are exchanged and, in a deferred mode, a Provision Discovery Request frame, a Provision Discovery Response frame, a Follow-on Provision Discovery request frame, and in some cases, a Follow-on Provision Discovery Response frame are exchanged.

An ASP that transmits and receives the Provision Discovery Request/Response frame may include information containing various attributes as listed in Table 2.

TABLE 2

| Attribute ID | Attribute | Provision Discovery Request | Provision Discovery Response |
|---|---|---|---|
| 2 | P2P Capability | Always Present | Always Present |
| 13 | P2P Device Info | Always Present | Always Present |
| 15 | P2P Group ID | Connection Capability Info indicates New or GO or (New, GO) or (Cli, GO) | Connection Capability Info indicates GO |
| 0 | Status | | Always Present |
| 17 | Operating Channel | Connection Capability Info indicates New or GO or (New, GO) or (Cli, GO) | Connection Capability Info indicates GO |

TABLE 2-continued

| Attribute ID | Attribute | Provision Discovery Request | Provision Discovery Response |
|---|---|---|---|
| 11 | Channel List | Connection Capability Info indicates New or (New, GO) | Connection Capability Info indicates Cli or GO |
| 22 | Session Information Data Info | Present only if the length of session_information is not 0 | — |
| 23 | Connection Capability Info | Always Present | Present in Provision Discovery Response if Status == Success |
| 24 | Advertisement ID Info | Always Present | Always Present |
| 5 | Configuration Timeout | Connection Capability Info indicates New or (New, GO) or (GO, Cli) | Connection Capability Info indicates GO or Cli |
| 6 | Listen Channel | Connection Capability Info indicates New or Cli | — |
| 26 | Session ID Info | Always Present | — |
| 27 | Session Information Response Data Info | — | Present if Status == "Fail; information is currently unavailable" |

As described above, if the auto_accept parameter is set to FALSE (auto_accept==FALSE) and thus the advertiser device calls the AdvertiseService Method, the ASP may set a status field to "Fail; information is currently unavailable", transmit a SessionRequest Event to a service entity, which is a higher layer (S716), and start a timer (e.g. 120 seconds).

If a user inputs acceptance or rejection on the advertiser device (S720) and the ASP receives a ConfirmSession Method with confirmed="TRUE" or "FALSE" from the service entity (S722), the ASP may stop the operating timer and transmit the Follow-on Provision Discovery Request frame to a peer ASP (S724). In this case, the ASP transmits the Follow-on Provision Discovery Request frame on a channel indicated by the Listen Channel attribute or a channel indicated by the Operating Channel attribute (if the Listen Channel attribute is not included in the Provision Discovery Request frame with the same ASP and the same Advertisement ID Info).

If the ConfirmSession Method is set to Confirmed="TRUE", a status code in the Status attribute is set to a value of "Success: Accepted by user". If the ConfirmSession Method is set to Confirmed="FALSE", the status code in the Status attribute is set to a value of "Fail: Rejected by user". If the Session ID Info, Advertisement ID Info, Listen Channel, and Operating Channel attributes are identically used in a previous provision discovery request frame received from the same peer ASP, the provision discovery procedure fails and, if the 120-second timer expires, P2P connection setup is aborted.

The advertiser device may transmit information indicating that the session has been deferred to the seeker device. For a session request, the seeker device transmits the Provision Discovery Request frame to the discovered advertiser device (S714) and the advertiser device may include information about a deferred session in the Provision Discovery Response frame in response to the Provision Discovery Request frame and transmit the Provision Discovery Response frame to the seeker device (S718).

The Provision Discovery Request frame transmitted by the seeker device includes advertisement ID related information about the advertiser device discovered in the device discovery and service discovery procedures. The advertisement ID related information includes information about a service advertised by the advertiser device. Accordingly, which WFDS service the seeker device desires to use may be identified through the advertisement ID related information included in the provision discovery request frame.

The advertiser device may include information indicating that a session request of a service has been deferred based on the advertisement ID included in the Provision Discovery Request frame while transmitting the Provision Discovery Response frame to the seeker device. The information about the deferred session may be the session_information_response parameter included in the above-described AdvertiseService Method call of the advertiser device. The seeker device may receive the Provision Discovery Response frame and may be aware that the session requested thereby has been deferred based on the fact that the session_information_response parameter is included in the provision discovery response frame. The Provision Discovery Response frame may include Session Information Data Info as one attribute and this information may be included when the status of a service indicates "Fail, information is currently unavailable".

In this case, the advertiser device may not only inform the seeker device that the session has been deferred but also further transmit additional information related to a service of the advertiser device. The advertiser device may transmit attribute information indicating an attribute of a service requested by the seeker in the advertiser device (e.g. print service is $0.1 per sheet).

Upon receiving the information indicating that the session request has been deferred from the advertiser device, the ASP of the seeker device may inform the service entity of the seeker device that the session request has been deferred (S716). The ASP of the seeker device may transmit the SessionRequest Event to the service entity in order to inform a device user that the session has been deferred and transmit SessionRequestDeferred indicating that the session request has not been immediately accepted as a status value.

Embodiment 1-3: Transmission of Session Deferment Information to User

As illustrated in FIG. 7, the ASP of the advertiser device may defer the session with respect to the session request of the seeker, i.e. with respect to the Provision Request frame, due to call of the AdvertiseService Method and inform the user of the advertiser device that the session has been deferred.

The ASP of the advertiser device may transmit the SessionRequest Event to the service entity in order to inform the device user that the session has been deferred and transmit SessionRequestDeferred indicating that the session request has not been immediately accepted as a status value.

In this case, delay may be present between the SessionRequest Event and the next event, i.e. a ConnectStatus (SessionRequest Accept) or ConnectStatus (SessionRequestFailed) Event. Since this delay is time to wait until the user performs input as to whether to accept the session request on the device, an event reception side may start a timer (e.g. 120 seconds).

The service entity of the advertiser device transmits session information including the above-described session deferment information to an application entity and the user may be aware that the session request of the seeker has been deferred and may determine whether to accept or reject the session request (S720). This determination is about whether to provide a service which can be supported by the advertiser device to the seeker device. Upon inputting a message indicating whether to accept the session request of the seeker, the service entity of the advertiser may call the ConfirmSession Method with respect to the ASP (S722).

If the user accepts the session request of the seeker, a subsequent procedure after a session connection is performed. Since the seeker device is aware that the session request has been deferred, the advertiser device may transmit a Follow-on Provision Discovery Request frame to the seeker device (S724) in order to inform the seeker device of the intention of session connection acceptance of the user. The advertiser device may transmit the Follow-on Provision Discovery Request frame including an advertisement ID, a session ID, and status information. The advertisement ID indicates information for identifying a WFDS service type and the session ID indicates information for identifying a requested session connection. The status information is information indicating that the session request has been accepted by the user. Upon receiving the information indicating that the session request has been accepted by the advertiser device, the seeker device may inform the service entity of the information of session request acceptance in the form of an event (e.g. ConnectStatusServiceRequestAccepted) and proceed to a group owner (GO) negotiation procedure between the two devices after the session is connected.

If the user accepts the session request, the advertiser device may transmit connection capability information of the advertiser device in addition to session deferment information to the seeker. In other words, the connection capability information of the advertiser device may be included in the Follow-on Provision Discovery Request frame.

Upon reception of the Follow-on Provision Discovery Request frame from the advertiser device, the seeker device may transmit a Follow-on Provision Discovery Response frame in response to the Follow-on Provision Discovery Request frame (S726). Table 3 shown below lists information about attributes included in the Follow-on Provision Discovery Request/Response frame.

TABLE 3

| Attribute ID | Attribute | Follow-on provision discovery request | Follow-on provision discovery response |
|---|---|---|---|
| 2 | P2P Capability | Always Present | Always Present |
| 13 | P2P Device Info | Always Present | Always Present |
| 15 | P2P Group ID | Connection Capability Information indicates New or GO or (New, GO) or (Cli, GO) | Connection Capability Information indicates GO |
| 0 | Status | Always Present | Always Present |
| 17 | Operating Channel | Connection Capability Information indicates New or GO or (New, GO) or (Cli, GO) | Connection Capability Information indicates GO |
| 11 | Channel List | Connection Capability Information indicates New or (New, GO) | Connection Capability Information indicates Cli or GO |
| 22 | Session Information Data Info | — | — |
| 23 | Connection Capability Info | Present if Status=="Success: Accepted by user" | Always Present |
| 24 | Advertisement ID Info | Always Present | Always Present |
| 5 | Configuration Timeout | Connection Capability Information indicates New or (New, GO) or (GO, Cli) | Connection Capability information indicates GO or Cli |
| 6 | Listen Channel | Connection Capability information indicates New or Cli | — |
| 26 | Session ID Info | Always Present | — |
| 27 | Session Information Response Data Info | — | — |

The Provision Discovery Response frame including the connection capability information may include information about a GO negotiation procedure of the device A. The Provision Discovery Response frame may further include information indicating whether the advertiser device operates as a GO of a P2P group or a group client (Cli) in the GO negotiation procedure after the session is connected. Whether the advertiser device is a GO or a Cli is set by a GO intent value determined as an arbitrary value between 0 to 15. Generally, a device having a large intent value becomes a GO and a device having a small value becomes a Cli. Alternatively, the opposite case is possible according to conditions. If the intent values of two devices are equal, a device that transmits a GO negotiation message first generally becomes the GO or vice versa.

Table 4 shown below lists GO negotiation information in the connection capability information included in the Provision Discovery Response frame.

TABLE 4

| Provision Discovery Requestor Connection Capability | Provision Discovery Requestor Connection Capability Description | Provision Discovery Responder Valid Connection Response | Connection Setup Procedure |
| --- | --- | --- | --- |
| 0x01 (new) | Requestor can become a GO of a new group or Cli. | 0x01 (new) | GO negotiation in a new P2P group. |
| | | 0x02 (Cli) | Requestor autonomously initiates a P2P group by becoming a GO of the P2P group. Responder joins a requestor's group. |
| | | 0x04 (GO) | Requestor joins a responder's group. |
| 0x02 (Cli) | Requestor can only join a group. | 0x04 (GO) | Requestor joins a responder's group. |
| 0x04 (GO) | Requestor is a GO and cannot become a Cli or a GO of an additional group. | 0x02 (Cli) | Responder joins a request's group. |
| 0x05 (New, GO) | Requestor can become a GO of a new group or Cli. Requestor also has an existing group that can be joined. | 0x01 (New) | GO negotiation in a new group. |
| | | 0x02 (Cli) | Responder joins a requestor's existing group. |
| | | 0x04 (GO) | Requestor joins a responder's group. |
| 0x06 (Cli, GO) | Requestor has an existing group that can be joined. Request can become a Cli. | 0x02 (Cli) | Responder joins a requestor's existing group. |
| | | 0x04 (GO) | Requestor joins a responder's group. |

A user may reject the session request of the seeker. Even in this case, the advertiser device may transmit the Follow-on Provision Discovery Request frame in order to inform the seeker device of the intention of session connection rejection. In this case, the Follow-on Provision Discovery Request frame includes information indicating session request rejection as status information.

Embodiment 2—Case of Presence of Existing P2P Connection

Figure 8:
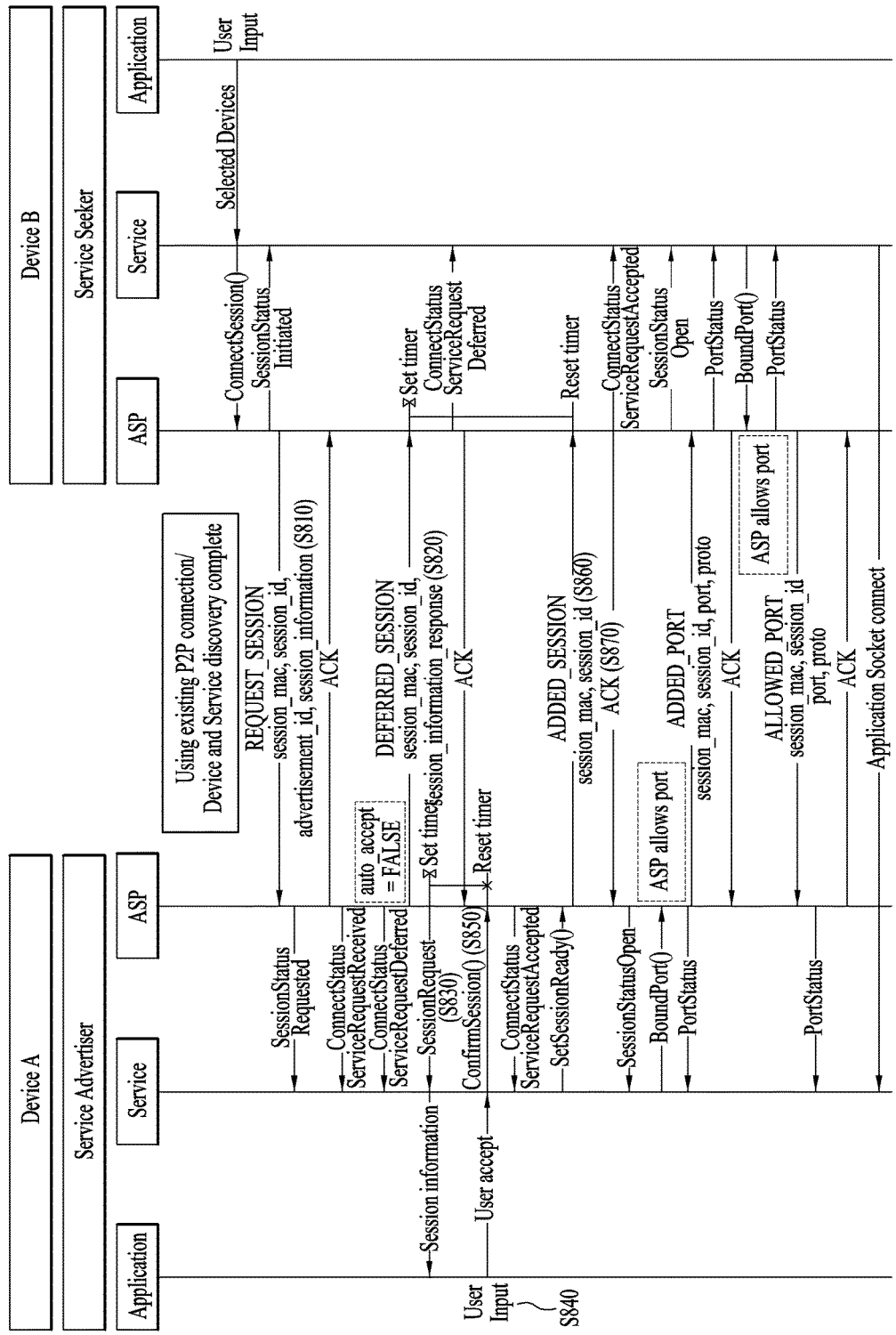
FIG. 8 is a flowchart illustrating another example of a session deferment setup procedure according to an embodiment of the present invention.

FIG. 8 is a diagram illustrating another example of a session deferment setup procedure according to an embodiment of the present invention.

As illustrated in FIG. 8, an existing connection between a seeker device and an advertiser device may be present. In this situation, the device discovery and service discovery procedures described in Embodiment 1 may be omitted. A session request may be immediately performed between the seeker device and the advertiser device.

When an existing connection between a device A (first device) and a device B (second device) is present, if the device A receives a session request message including an advertisement ID from the device B and should wait for a confirmation session for a service related session request based on the advertisement ID (i.e. the case in which automatic acceptance is not set up and session deferment is set up), a session deferment message may include session deferment information related to the service when the device A transmits the session deferment message to the device B.

Hereinafter, the above-described process will be described in more detail.

Embodiment 2-1: Session Deferment Setup During Calling of AdvertiseService Method Even when a session request is performed between devices of an existing connection, inclusion of session determent setup information during calling of an AdvertiseService Method is the same as in Embodiment 1. Therefore, the AdvertiseService Method may include a session information response (session_information_response) parameter which is information for setup for deferring the session request.

The session_information_response parameter is present only when the auto_accept parameter indicates FALSE (the case in which the session is established to be deferred) and, otherwise (auto_accept=TRUE), the session_information_ response parameter indicates NULL. That is, the session_information_response parameter is not present in the AdvertiseService Method.

If the session_information_response parameter is present in the AdvertiseService Method, the session_information_response parameter is transmitted to an ASP of a seeker. If a provision discovery request is transmitted as part of ASP-session setup, the session_information_response parameter may be included as a session information response field of Session Information Response Data Info attribute. If there is a connection between two devices, the session_information_response parameter may be included in a session information response field of a deferred session ASP (DEFERRED_SESSION ASP) coordination protocol message. The ASP of the seeker transmits the session_information_response parameter to a service entity of a seeker. In this case, the ASP of the seeker may transmit the session_information_response parameter by setting a value of the ConnectStatus Event to status=ServiceRequestDeferred.

An advertisement ID (advertisement_id) parameter may be necessary. The advertisement_id parameter is defined by the ASP and the advertisement of a device for manipulation by a service that requests advertisement may be uniquely identified through the advertisement_ d parameter. The advertisement_id parameter is transmitted to the seeker to establish an ASP-session. The advertisement_id parameter may be used in Methods such as ServiceStatusChange, CancelAdvertiseService, and ConnectSessions, Events such as SearchResult, AdvertiseStatus, and SessionRequest, and a session request (REQUEST_SESSION) message for calling a specific AdvertiseService Method. An advertisement of a WFDS may be uniquely identified by exchanging advertisement_id and service MAC between devices.

Embodiment 2-2: Session Request and Session Deferment Messages

A seeker device may request an advertiser device to connect a session by transmitting a REQUEST_SESSION message (S810). This session request frame may include a session MAC (session_mac), a session ID (session_id), an advertisement ID (advertise_id), and session information (session_information).

The advertiser device that has received the REQUEST_SESSION message does not immediately accept the session request, i.e. a session is deferred, because the deferment for the session request is set up and may transmit a session deferment (DEFERRED_SESSION) message including information indicating that the session has been deferred to the seeker device (S820). The information indicating that the session has been deferred may be session information response (session_information_response) information as in Embodiment 1. Prior to description of the REQUEST_SESSION message and the DEFERRED_SESSION message, a general message format will now be described with reference to Table 5 shown below.

TABLE 5

| Field | Size (octets) | Value | Description |
| --- | --- | --- | --- |
| Opcode | 1 | Refer to Table 6. | Opcode for each message is listed below in Table 6. |

TABLE 5-continued

| Field | Size (octets) | Value | Description |
| --- | --- | --- | --- |
| Sequence Number | 1 | | Sequence number is incremented by 1 whenever device transmits a new message. |
| Payload | Variable | | Each message type is defined by a payload format. |

As in Table 5, an ASP Coordination Protocol message is a single user datagram protocol (UDP) datagram. The ASP coordination protocol will be described in more detail. An ASP of one device may communicate with an ASP of a peer device to manage a Wi-Fi Direct session. The ASP coordination protocol may be used for such communication. The ASP coordination protocol may operate over a UDP of a port and the service advertiser may open a UDP port after network setup is completed. In a session connection between the ASP of the advertiser device and the ASP of the seeker device, one device may serve as a UDP server and another device may serve as a UDP client. In addition, both the seeker and the advertiser may simultaneously serve as the UDP server and the UDP client, thereby performing an ASP coordination protocol operation.

A new command may not be transmitted until a previous message indicates acknowledgement (ACK). Each command includes a sequence number used to differentiate new commands from retransmitted commands.

In order to solve problems of order mixing, which is a disadvantage in existing UDP transmission, or packet loss, the ASP coordination protocol causes a transmitter to increase a sequence number for each message upon transmitting a new message and a receiver to respond to a correct ASP Coordination Protocol message by including a sequence number corresponding to a received message in an ACK message, thereby confirming transmission/reception of a message transmitted by the transmitter. ASPs of all WFDS devices cannot transmit the next message when ACK for the transmitted message is not received. If the transmitter does not receive ACK for the transmitted message for a predetermined time, the transmitter may perform retransmissions of the maximum number of retries. The sequence number is not increased during retransmission. The sequence number is increased starting from 0 and, if the sequence number reaches a maximum value expressed as one byte, the sequence number is reset to 0 again. If the retransmitted message reaches the receiver, all sessions including an addressed ASP may be closed. When the message is retransmitted, the message may have the same sequence number, same message type, and same payload as a previous message. When a device receives the same duplicate message, the device may ignore the corresponding message before transmitting an ACK message.

The format of the ACK message of the ASP coordination protocol includes 1-byte operation code (Opcode) information indicating the ACK message and a sequence number. The sequence number included in the ACK message functions to confirm whether the received message is a correct message and is set to the same value as a sequence number of the received message when the received message is a correct message.

One ASP Coordination Protocol message begins with the 1-byte Opcode information and may be divided as listed in Table 6. The next 1-byte information corresponds to a sequence number and the sequence number is incremented by one when the ACK message is received and the Opcode of the next message is 0 to 5.

TABLE 6

| Opcode | Message |
|---|---|
| 0 | REQUEST_SESSION |
| 1 | ADDED_SESSION |
| 2 | REJECTED_SESSION |
| 3 | REMOVE_SESSION |
| 4 | ALLOWED_PORT |
| 5 | DEFERRED_SESSION |
| 6-253 | Reserved |
| 254 | ACK |
| 255 | NACK |

As shown in Table 6, the Opcode indicates session request (REQUEST_SESSION), session addition (ADDED_SESSION), session rejection (REJECTED_SESSION), session removal (REMOVED_SESSION), port allowance (ALLOWED_PORT), session deferment (DEFERRED_SESSION), ACK, and NACK messages. The formats of the respective messages will be described in more detail with reference to of Table 7 to Table 14. Table 7 shows the format of the REQUEST_SESSION message, Table 8 shows the format of the ADDED_SESSION message, Table 9 shows the format of the REJECTED_SESSION message, Table 10 shows the format of the REMOVED_SESSION message, Table 11 shows the format of the ALLOWED_PORT message, Table 12 shows the format of the DEFERRED_SESSION message, Table 13 shows the format of the ACK message, and Table 14 shows the format of the NACK message.

TABLE 7

| Field | Size (octets) | Value | Description |
|---|---|---|---|
| Opcode | 1 | 0x00 | Opcode is defined in Table 6. |
| Sequence number | 1 | Variable | Sequence number is assigned at transmission time. |
| Session_mac | 6 | Variable | MAC address used in combination with session_id to uniquely identify ASP-session. |
| Session_id | 4 | Variable | ID used in combination with session_mac to uniquely identify ASP-session. |
| Advertisement_id | 4 | Variable | ID of a service advertised by the recipient of this message |
| session_information_length | 1 | Variable (0-144) | Length of Session_information field (octets) |
| Session_information | Variable (0-144) | Variable | session_information data when received in ConnectSessions Method |

Table 7 shows the format of the REQUEST_SESSION message. An ASP of a seeker device may transmit a new ASP-session request for advertised advertisement_id to an ASP of an advertiser device. Upon receiving the REQUEST_SESSION message, the advertiser device may transmit the ADDED_SESSION or REJECT_SESSION message. In the case of session failure, the advertiser device may transmit a SessionFailed( ) Event to a service entity. Conversely, if the REQUEST_SESSION message is successfully received, the advertiser device may transmit a SessionConnected( )) Event to the service entity.

TABLE 8

| Field | Size (octets) | Value | Description |
|---|---|---|---|
| Opcode | 1 | 0x01 | Opcode is defined in Table 6. |
| Sequence number | 1 | Variable | Sequence number is assigned at transmission time. |
| session_mac | 6 | Variable | MAC address used in combination with session_id to uniquely identify ASP-session. This value is received in previous REQUEST_SESSION. |
| session_id | 4 | Variable | ID used in combination with session_mac to uniquely identify ASP-session. This value is received in previous REQUEST_SESSION. |

Table 8 shows the format of the ADDED_SESSION message. As shown in Table 8, the service advertiser device may transmit the ADDED_SESSION message when a requested service entity calls a SetSessionReady Method. After confirming the ADDED_SESSION message, the seeker device may transmit the REMOVED_SESSION message when the seeker device calls a CloseSession Method.

TABLE 9

| Field | Size (octets) | Value | Description |
|---|---|---|---|
| Opcode | 1 | 0x02 | Opcode is defined in Table 6. |
| Sequence number | 1 | Variable | Sequence number is assigned at transmission time. |
| session_mac | 6 | Variable | MAC address used in combination with session_id to uniquely identify |

TABLE 9-continued

| Field | Size (octets) | Value | Description |
|---|---|---|---|
| session_id | 4 | Variable | ASP-session. This value is received in previous REQUEST_SESSION. ID used in combination with session_mac to uniquely identify ASP-session. This value is received in previous REQUEST_SESSION. |

Table 9 shows the format of the REJECTED_SESSION message. As shown in Table 9, if the service entity or the ASP decides to reject an ASP-session, the service advertiser device may transmit the REJECTED_SESSION message after receiving the REQUEST_SESSION message.

TABLE 10

| Field | Size (octets) | Value | Description |
|---|---|---|---|
| Opcode | 1 | 0x03 | Opcode is defined in Table 6. |
| Sequence number | 1 | Variable | Sequence number is assigned at transmission time. |
| session_mac | 6 | Variable | MAC address used in combination with session_id to uniquely identify ASP- session. This value is received in previous REQUEST_SESSION. |
| session_id | 4 | Variable | ID is used in combination with session_mac to uniquely identify ASP-session. This value is received in previous REQUEST_SESSION. |

Table 10 shows the format of the REMOVED_SESSION message. As shown in Table 10, when close of the ASP-session on both sides of a link is called, the REMOVED_SESSION message may be transmitted.

TABLE 11

| Field | Size (octets) | Value | Description |
|---|---|---|---|
| Opcode | 1 | 0x04 | Opcode is defined in Table 6. |
| Sequence number | 1 | variable | Sequence number is assigned at transmission time. |
| session_mac | 6 | Variable | MAC address used in combination with session_id to uniquely identify ASP-session. |

TABLE 11-continued

| Field | Size (octets) | Value | Description |
|---|---|---|---|
| session_id | 4 | Variable | ID is used in combination with session_mac to uniquely identify ASP-session. |
| Port | 2 | Variable | Port number currently allowed |
| proto | 1 | Variable | protocol ID |

Table 11 shows the format of the ALLOWED_PORT message. As shown in Table 11, when a port or proto combination is opened for a specific session, the ALLOWED_PORT message may be transmitted by the ASP.

TABLE 12

| Field | Size (octets) | Value | Description |
|---|---|---|---|
| Opcode | 1 | 0x05 | Opcode is defined in Table 6. |
| Sequence number | 1 | Variable | Sequence number is assigned at transmission time. |
| session_mac | 6 | Variable | MAC address used in combination with session_id to uniquely identify ASP-session. This value is received in previous REQUEST_SESSION. |
| session_id | 4 | Variable | ID is used in combination with session_mac to uniquely identify ASP-session. This value is received in previous REQUEST_SESSION. |
| Session_information_response_length | 1 | Variable (0-144) | Length of Session_information field (octets) |
| Session_information_response | Variable (0-144) | Variable | session_information data when received in AdvertiseService method |

Table 12 shows the format of the DEFERRED_SESSION message. In Table 12 showing the format of the DEFERRED_SESSION message, the advertiser device may transmit the DEFERRED_SESSION message in response to the SESSION_REQUEST message of the seeker device and transmit the ConnectStatus (status=ServiceRequestDeferred) Event to the service entity.

TABLE 13

| Field | Size (octets) | Value | Description |
|---|---|---|---|
| Opcode | 1 | 0xFE | Opcode is defined in Table 6. |
| Sequence number | 1 | variable | Sequence number is assigned at transmission time. |
| session_mac | 6 | Variable | MAC address used in combination with session_id to uniquely identify ASP-session. |
| session_id | 4 | Variable | ID is used in combination with session_mac to uniquely identify ASP-session. |

Table 13 shows the format of the ACK message. As shown in Table 13, the ASP may transmit the ACK message as a response upon receiving an ASP Coordination Protocol message within a predetermined time. A sequence number in the ACK message may equal to a sequence number of a recently received ASP Coordination Protocol message. session_mac and session_id pair may be identical to the pair of the recently received ASP Coordination Protocol message.

TABLE 14

| Field | Size (octets) | Value | Description |
|---|---|---|---|
| Opcode | 1 | 0xFF | Opcode is defined in Table 6. |
| Sequence number | 1 | variable | Sequence number is assigned at transmission time. |
| session_mac | 6 | Variable | MAC address used in combination with session_id to uniquely identify ASP-session. |
| session_id | 4 | Variable | ID is used in combination session_mac to uniquely identify with ASP-session. |
| Reason | 4 | Variable | 0x00: Invalid session_mac<br>0x01: Invalid session_id<br>0x02: Invalid Opcode<br>0x03: Invalid Sequence number<br>0x04: Non-existence of session or close of session<br>0x05: Reason unknown |

Finally, Table 14 shows the format of the NACK message. As shown in Table 14, the ASP may transmit the NACK message as a response upon receiving an invalid ASP Coordination Protocol message within a predetermined time. A sequence number in the NACK message may be identical to a sequence number of the recently received ASP Coordination Protocol message. Session_mac and session_id pair may be identical to the pair of the recently received ASP Coordination Protocol message.

Embodiment 2-3: Transmission of Session Deferment Information to User

As illustrated in FIG. 8, the ASP of the advertiser device may defer the session with respect to a session request of the seeker, i.e. with respect to a provision request frame, due to call of an AdvertiseService Method and inform the user of the advertiser device that the session has been deferred.

The ASP of the advertiser device may transmit a SessionRequest Event to the service entity in order to inform the device user that the session has been deferred (S830) and transmit SessionRequestDeferred indicating that the session request has not been immediately accepted as a status value.

In this case, delay may be present between the SessionRequest Event and the next event, i.e. a ConnectStatus (SessionRequest Accept) or ConnectStatus (SessionRequestFailed) Event. Since this delay is time to wait until the user performs input as to whether to accept the session request on the device, an event reception side may start a timer (e.g. 120 seconds).

The service entity of the advertiser device transmits session information including the above-described session deferment information to an application entity and the user may be aware that the session request of the seeker has been deferred and may determine whether to accept or reject the session request (S840). This determination is about whether to provide a service which can be supported by the advertiser device to the seeker device. Upon inputting a message indicating whether to accept the session request of the seeker, the service entity of the advertiser may call the ConfirmSession Method to the ASP (S850).

If the user accepts the session request of the seeker, a subsequent process after a session connection is performed. Since the seeker device is aware of that the session request has been deferred, the advertiser device may transmit an ADDED_SESSION message to the seeker device (S860) in order to inform the seeker device of the intention of session connection acceptance of the user. The advertiser device may include session MAC and session ID information in the ADDED_SESSION message and then transmit the ADDED_SESSION message. A unique ASP-session may be identified by combination of session MAC and session ID. Upon receiving information indicating that the session request is accepted from the advertiser device, the seeker device may inform the service entity of the information indicating that the session request is accepted in the form of an event (e.g. ConnectStatusServiceRequest Accepted) and transmit an ACK message to the advertiser device again (S870).

Figure 9:
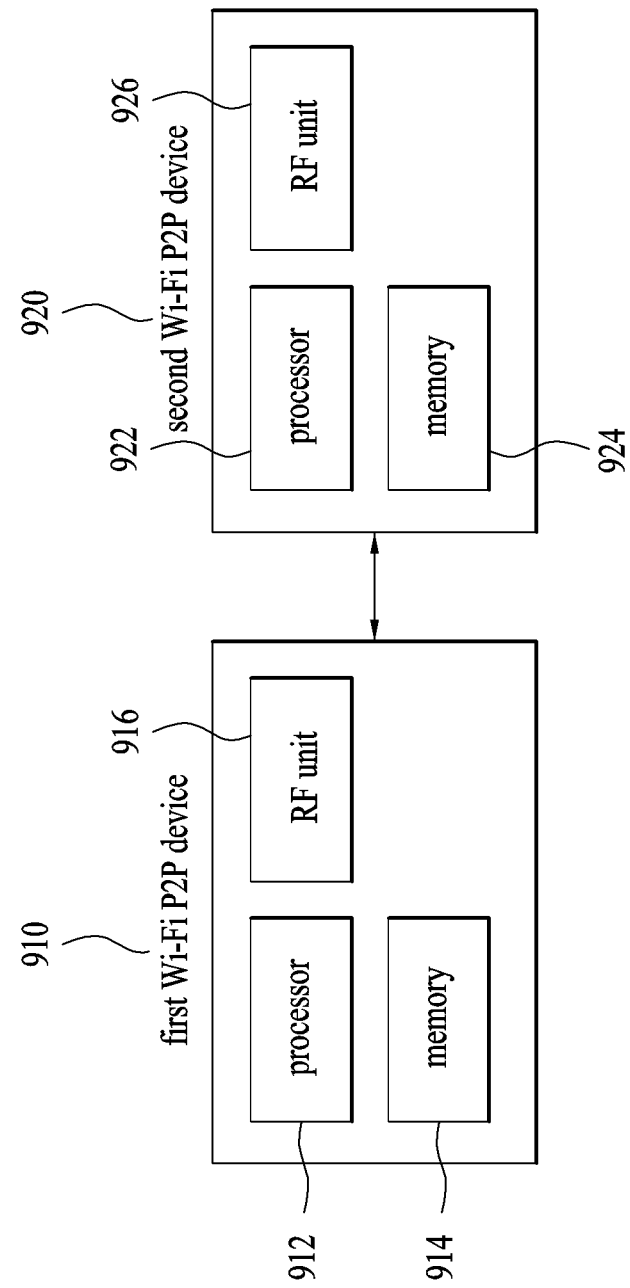
FIG. 9 illustrates a Wi-Fi P2P device that is applicable to the present invention.

FIG. 9 illustrates a Wi-Fi P2P device that is applicable to the present invention.

Referring to FIG. 9, a Wi-Fi P2P network includes a first Wi-Fi P2P device 910 and a second Wi-Fi P2P device 920. The first Wi-Fi P2P device 910 includes a processor 912, a memory 914, and a radio frequency (RF) unit 916. The processor 912 may be configured to implement the procedures and/or methods proposed in the present invention. The memory 914 is connected to the processor 912 and stores information related to operation of the processor 912. The RF unit 916 is connected to the processor 912 and transmits and/or receives a radio signal. The second Wi-Fi device 920 includes a processor 922, a memory 924, and an RF unit 926. The processor 922 may be configured to implement the procedures and/or methods proposed in the present invention. The memory 924 is connected to the processor 922 and stores information related to operation of the processor 922. The RF unit 926 is connected to the processor 922 and transmits and/or receives a radio signal. The first Wi-Fi P2P device 910 and/or the second Wi-Fi P2P device 920 may include a single antenna or multiple antennas.

The embodiments described hereinabove are combinations of elements and features of the present invention in a predetermined format. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment. Claims that are not explicitly cited in each other in the appended claims may be presented in combination as an embodiment of the present invention or included as a new claim by subsequent amendment after the application is filed.

The embodiments according to the present invention may be implemented by various means, for example, by hardware, firmware, software, or a combination thereof. In a hardware configuration, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

In a firmware or software configuration, an embodiment of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

It is apparent to those skilled in the art that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

INDUSTRIAL APPLICABILITY

The embodiments of the present invention are applicable to various wireless access systems. Particularly, the embodiments of the present invention are applicable to a Wi-Fi Direct services (WFDS) system. The embodiments of the present invention are applicable not only to the above system but also to all technical fields applying the various wireless access systems.

The invention claimed is:

1. A method for setting up Wi-Fi Direct services (WFDS) communication, the method performed by a first device and comprising:
receiving a first provision discovery request frame including advertisement identifier (ID) related information from a second device; and
transmitting a first provision discovery response frame to the second device,
wherein the first provision discovery response frame includes information related to deferment of a session related to the services when a value of auto_accept included in an AdvertiseService method is set to 'False'.

2. The method according to claim 1, wherein
the information related to the deferment is transmitted from a service entity of the first device to an application service platform (ASP) of the first device when the first device calls the AdvertiseService method.

3. The method according to claim 2, wherein the AdvertiseService method is called before the first device receives the first provision discovery request frame.

4. The method according to claim 3, wherein:
a procedure for discovering the first device and the services is performed before the first device receives the first provision discovery request frame; and
the AdvertiseService method is called before the first device is discovered.

5. The method according to claim 2, further comprising the ASP transmitting the information related to the deferment to a user of the first device.

6. The method according to claim 2, further comprising an ASP of the second device transmitting the information related to the deferment to a service entity of the second device.

7. The method according to claim 5, further comprising transmitting a second provision request frame to the second device and receiving a second provision response frame from the second device when the user of the first device accepts session deferment.

8. The method according to claim 7, wherein the second provision discovery request frame includes connection capability information of the first device.

9. The method according to claim 8, further comprising:
transmitting a peer-dependent negotiation message to the second device as negotiation information of a peer-to-peer (P2P) group;
becoming a group client of the P2P group upon receiving a response from the second device indicating that the second device becomes a group owner of the P2P group; and
becoming a group owner of the P2P group upon receiving a response from the second device indicating that the second device becomes a group client of the P2P group.

10. The method according to claim 8, further comprising:
becoming a group owner of a peer-to-peer (P2P) group; and
transmitting a message to the second device as negotiation information of the P2P group, the message indicating that the first device becomes a the group owner.

11. The method according to claim 8, further comprising:
becoming a group client of a peer-to-peer (P2P) group; and
transmitting a message to the second device as negotiation information of the P2P group, the message indicating that the first device becomes the group client.

12. A method for setting up Wi-Fi Direct services (WFDS) communication, the method performed by a first device and comprising:
receiving a session request message including an advertisement identifier (ID) from a second device when an existing connection between the first device and the second device is present; and
transmitting a session deferment message to the second device,
wherein the session deferment message includes information related to deferment of a session related to the services when a value of auto_accept included in an AdvertiseService method is set to 'False'.

13. The method according to claim 12, wherein the session request message and the session deferment message are configured to include an operation code (Opcode) and a sequence number.

14. The method according to claim 12, wherein
the information related to the deferment is transmitted from a service entity of the first device to an application service platform (ASP) of the first device when the first device calls the AdvertiseService method.

15. A method for setting up Wi-Fi Direct services (WFDS) communication, the method performed by a first device and comprising:
transmitting a first provision discovery request frame including advertisement identifier (ID) related information to a second device; and
receiving a first provision discovery response frame from the second device,
wherein the first provision discovery response frame includes information related to deferment of a session related to the services when a value of auto_accept included in an AdvertiseService method is set to 'False'.

16. The method according to claim 15, wherein
the information related to the deferment is transmitted from a service entity of the first device to an application service platform (ASP) of the first device when the first device calls the AdvertiseService method.

17. A first device for setting up Wi-Fi Direct services (WFDS) communication, the apparatus comprising:
a transceiver configured to send and receive information; and
a processor configured to:
control the transceiver to receive a first provision discovery request frame including advertisement identifier (ID) related information from a second device; and control the transceiver to transmit a first provision discovery response frame to the second device,
wherein the first provision discovery response frame includes information related to deferment of a session related to the services when a value of auto_accept included in an AdvertiseService method is set to 'False'.

18. The device according to claim 17, wherein
the information related to the deferment is transmitted from a service entity of the first device to an application service platform (ASP) of the first device when the first device calls the AdvertiseService method.

\* \* \* \* \*